Patented June 17, 1941

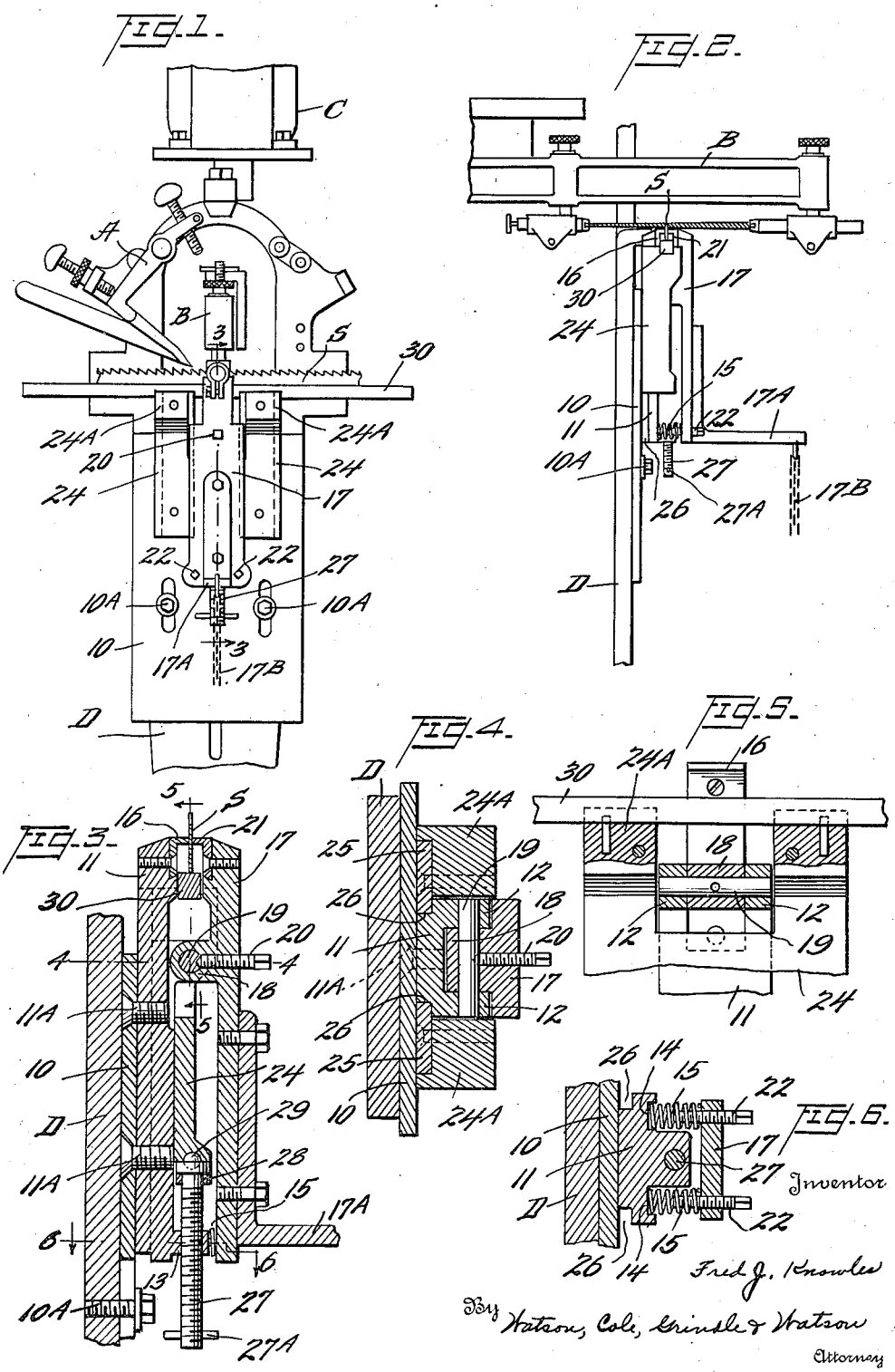

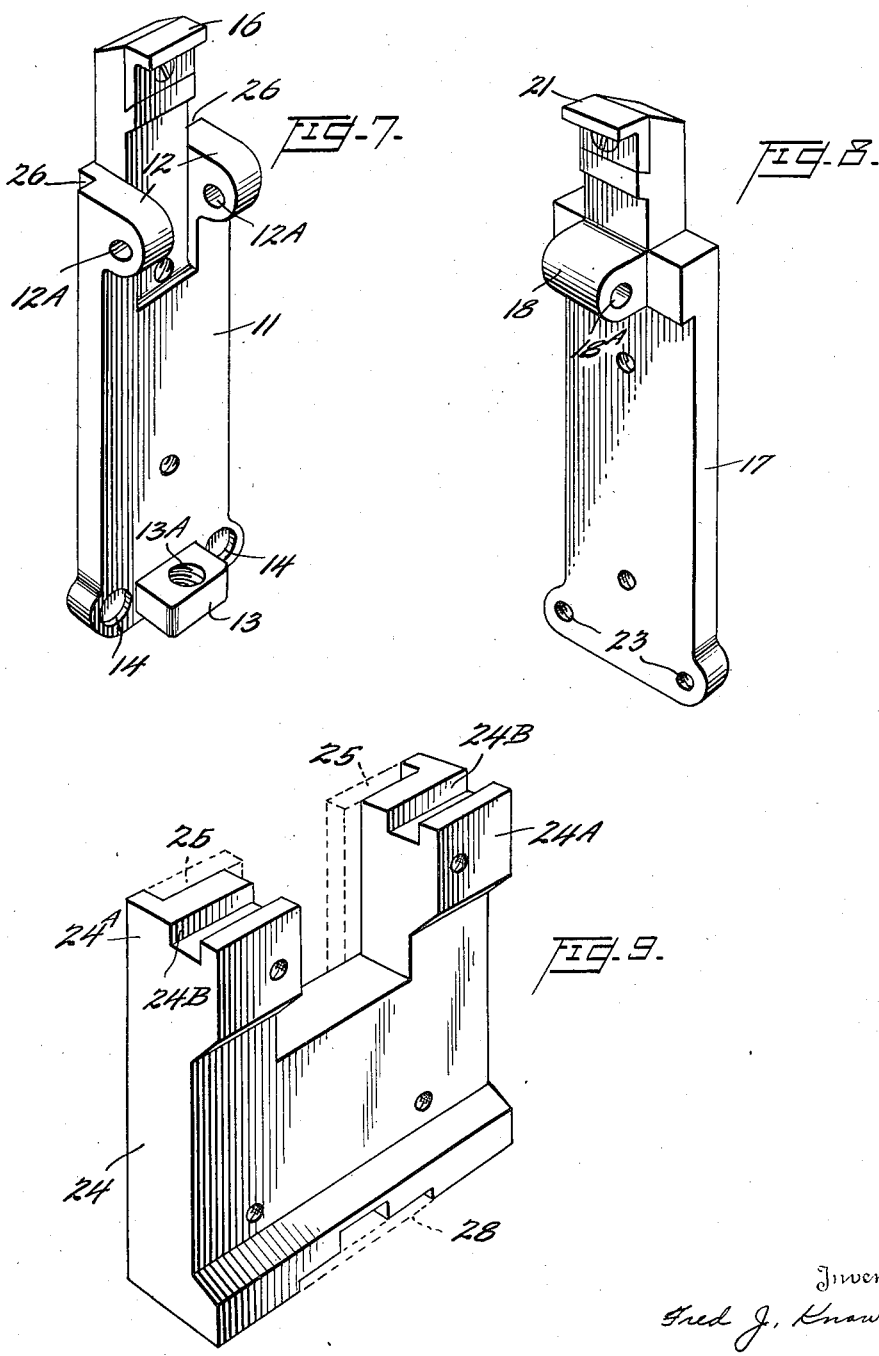

2,245,982

UNITED STATES PATENT OFFICE 2,245,982

VISE FOR SAW FILING MACHINES

Fred J. Knowles, Philadelphia, Pa., assignor to Nicholson File Company, Providence, R. I., a corporation of Rhode Island Application December 2, 1938, Serial No. 243,635

2 Claims. (Cl. 76—78)

This invention relates to a vise for holding a saw in a saw filing machine while the teeth of the saw are acted upon by a file secured in the machine. Arrangements of this general character are well known as shown for example by the Foley Patent No. 1,224,293.

The purpose of the present invention is to provide a vise which will firmly but yieldingly grip a saw on ech side adjacent the saw teeth thereof and hold it rigidly in position during the filing operation so as to produce a smooth filing operation and avoid any vibration or chattering of the saw during such operation. A further object is to provide a vise which includes mechanism by which the position of the saw in the vise may be readily adjusted manually so that the teeth of the saw can be properly and accurately positioned relative to the file in the machine. A still further object is to provide means by which the jaws of the vise may be readily opened to permit easy removal or insertion of a saw between the jaws or adjustment of same in the jaws. Other advantages and purposes of the invention will be apparent from the following specification taken in connection with the accompanying drawings illustrating one embodiment thereof and in which:

Figure 1 is a front elevation of the improved vise as applied to a saw filing machine of the kind shown in the aforementioned patent;

Figure 2 is a side elevation of the arrangement shown in Figure 1;

Figure 3 is a vertical section on the line 3—3 of Figure 1;

Figure 4 is a horizontal sectional view on the line 4—4 of Figure 3;

Figure 5 is a vertical section on the line 5—5 of Figure 3;

Figure 6 is a horizontal section on the line 6—6 of Figure 3;

Figure 7 is an enlarged perspective view of the inner jaw of the vise;

Figure 8 is an enlarged perspective view of the outer jaw thereof; and

Figure 9 is a perspective view of the adjustable table or support for positioning and holding a saw between the jaws of the vise.

As before noted, the present invention is readily applicable to various forms of saw filing machines, but for purposes of illustration it is shown as applied to the form of machine disclosed in said Foley patent. In the accompanying drawings, A indicates generally an automatic saw feeding means such as employed in said patent, and B indicates the means for supporting and operating the file, a driving motor being indicated at C. The various machines now in use also generally include a rigid part or parts to which the structure forming the present invention may be readily attached. Such a part is illustrated at D in the drawings.

As a convenient means for securing the improved vise in position, an adapter or supporting plate 10 is rigidly and adjustably secured to the part D as by bolts 10A. The inner jaw of the vise, indicated at 11, is rigidly mounted on the plate 10 by bolts or screws 11A. Adjacent its upper end the jaw 11 is provided with spaced outwardly projecting ears 12 having aligned openings 12A therein, and adjacent its lower end said jaw 11 carries an outwardly projecting lug 13 having therein a vertically extending threaded opening 13A. On each side of the lug 13 the jaw is provided with a socket 14 for receiving and supporting the ends of coiled springs 15, as later described. A jaw piece 16 in the form of an angle iron is mounted on the upper end of the jaw 11.

The outer jaw 17 of the vise is arranged in front of the inner jaw 11 and is provided on its rear side with an ear 18 which fits between the ears 12 of the inner jaw, the ear 18 having therein a transverse opening 18A. A pivot pin 19 is arranged in the openings 12A and 18A of the jaws and is secured in the ear 18 of the outer jaw by means of a set screw 20. A jaw piece 21 is mounted on the upper end of the jaw 17 for cooperating with the jaw piece 16 of the inner jaw. The pivot pin 19 serves to pivotally connect the two jaws 11 and 17 intermediate their length so that when the lower end of the outer jaw is moved outwardly or inwardly the jaw piece 21 is moved toward or from the jaw piece 16 of the inner jaw. The springs 15 above mentioned arranged between the lower ends of the jaws 11 and 17 are held in place by set screws 22 extending through openings 23 of the jaw 17 and into said springs. It will be understood that the springs 15 normally act to force the lower end of the jaw 17 outwardly and the jaw piece 21 toward the jaw piece 16 of the inner jaw, so as to clamp a saw between them as indicated at S. When the lower end of the jaw 17 is forced inwardly against the action of the springs 15, the jaw piece 21 is moved away from the jaw piece 16 to relieve the clamping action on the saw S. To assist in moving the lower jaw as indicated, an outwardly projecting arm 17A is secured thereto, and a chain 17B is connected to this arm and to a foot pedal or lever (not shown) placed in a convenient position for the operator.

A vertically adjustable support or table 24 is arranged between the jaws 11 and 17, and the upper end of said support is cut away to provide spaced portions 24A between which the ears 12 and 18 of the jaws are positioned when the parts are assembled. To secure the table or support 24 in position to slide vertically, the same is provided on the inner side thereof with two gib plates 25 bolted thereto, and these plates engage and slide in undercut recesses 26 formed on the rear side of the inner jaw 11. To provide means for adjusting the support 24, an adjusting screw 27 is threadedly mounted in the lug 13 of the inner jaw and the upper end thereof is rotatably secured in the lower end of the support 24 by means of a holding plate 28, the upper end or head of the screw 27 preferably bearing against a ball 29 mounted in a suitable socket in the support 24. The lower end of the screw 27 is provided with a transverse pin 27A or any other suitable means for manually rotating the same and adjusting the table or support 24. The upper edges of the portions 24A of the table or support are provided with aligned rectangular grooves 24B, and removably secured in these grooves is a transverse saw supporting bar 30 which may be of any length desired to support a saw in position to be filed. As indicated, particularly in Figure 3, the saw S to be filed rests against the bar 30 and is clamped between the jaws of the vise.

To operate the vise, the lower end of the outer jaw is forced inwardly by pressure on the arm 17A which will separate the jaws. A saw may then be inserted with the back thereof resting on the supporting bar 30, and the position of this bar may be adjusted by turning the adjusting screw 27 to move the support 24 upwardly or downwardly. The saw may thus be accurately and quickly positioned with reference to the file mounted in the machine and also in reference to the feed dog which moves the saw step by step beneath the file. The jaws of the vise firmly grip and hold the saw on both sides close to the point where the file operates on the teeth of the saw, so that smooth and quiet operation of the file on the work is obtained.

Having thus described the invention, what is claimed as new and desired to be secured by Letters Patent is:

1. In a vise for saw filing machines, in combination, an inner jaw rigidly and adjustably secured to the machine and having outwardly projecting spaced ears thereon adjacent the upper end, an outer jaw having adjacent its upper end a single inwardly projecting ear arranged between and pivotally connected to the ears on said inner jaw, a saw supporting table carried by and slidably supported on said inner jaw, said table having laterally spaced portions between which said ears of the inner and outer jaws are arranged, a screw carried by said inner jaw for vertically adjusting said table, a saw supporting bar carried by the spaced portions of said table, a spring disposed directly between the lower ends of said jaws and being the sole means for forcing the same apart and for forcing the upper ends of the jaws together to clamp the saw, and manually operable means for forcing the lower end of the outer jaw toward the inner jaw against the action of said spring to open said vise.

2. In a vise for saw filing machines, in combination, a supporting plate rigidly and adjustably secured to the machine, an inner jaw mounted on said plate and having outwardly projecting spaced ears thereon adjacent its upper end, an outer jaw having adjacent its upper end a single inwardly projecting ear arranged between and pivotally connected to the ears on said inner jaw, a saw supporting table carried by and slidably supported on said inner jaw, said table having laterally spaced portions between which said ears of the inner and outer jaws are arranged, a screw carried by said inner jaw for vertically adjusting said table, a saw supporting bar carried by the spaced portion of said table, a spring disposed directly between the lower ends of said jaws and being the sole means for forcing the same apart and for forcing the upper ends of the jaws together to clamp the saw, and a pedal operatively connected with the movable outer jaw for forcing the lower end of the outer jaw toward the inner jaw against the action of said spring to open said vise.

FRED J. KNOWLES.